(12) United States Patent
Wu et al.

(10) Patent No.: US 10,380,910 B2
(45) Date of Patent: Aug. 13, 2019

(54) PHYSICALLY INTUITIVE RESPONSE INHIBITION TASK FOR ENHANCING COGNITION

(71) Applicant: LUMOS LABS, INC., San Francisco, CA (US)

(72) Inventors: David Wu, San Francisco, CA (US); Benjamin Lee Ahroni, San Francisco, CA (US); Aaron Kaluszka, San Francisco, CA (US)

(73) Assignee: LUMOS LABS, INC., San Francisco, CA (US)

( * ) Notice: Subject to any disclaimer, the term of this patent is extended or adjusted under 35 U.S.C. 154(b) by 296 days.

(21) Appl. No.: 14/318,241

(22) Filed: Jun. 27, 2014

(65) Prior Publication Data

US 2015/0004577 A1  Jan. 1, 2015

Related U.S. Application Data

(60) Provisional application No. 61/841,590, filed on Jul. 1, 2013.

(51) Int. Cl.
*G09B 19/00* (2006.01)
(52) U.S. Cl.
CPC .................. *G09B 19/00* (2013.01)
(58) Field of Classification Search
CPC ... G09B 5/00; G09B 5/02; G09B 5/06; G09B 7/00; G09B 7/02; G09B 7/04;
(Continued)

(56) References Cited

U.S. PATENT DOCUMENTS 5,231,661 A  7/1993  Harnum et al.
5,267,734 A  12/1993  Stamper et al.
(Continued)

FOREIGN PATENT DOCUMENTS

JP  2002222435 A  8/2002
KR  20080013829 A  2/2008
(Continued)

OTHER PUBLICATIONS

Groffman, S., "Subitizing: Vision Therapy for Math Deficits", Optometry & Vision Development, 40(4):229-238 (2009).
(Continued)

*Primary Examiner* — Thomas J Hong
(74) *Attorney, Agent, or Firm* — Shartsis Friese LLP; Cecily Anne O'Regan

(57) ABSTRACT

A method and system for enhancing a cognitive ability may comprise conducting, via a user interface display of a user computing device, a training session which may comprise presenting, via the user interface display of the user computing device, a variable stimuli go/no-go behavior response exercise, which may comprise establishing an assembly platform containing an outline of component parts of a final assembled item; presenting a plurality of component delivery platforms; delivering a component corresponding to at least one of the plurality of components of the final assembled item to at least one of the component delivery platforms; allowing the user to select or not select the component on the at least one of the plurality of component delivery platforms according to at least one selection criteria; and scoring the correctness of the user selecting or not selecting the component according to the at least one selection criteria.

16 Claims, 11 Drawing Sheets

(58) Field of Classification Search
CPC ....... G09B 15/023; G09B 19/00; A63F 13/00; A63F 2300/102; A63F 2300/63; A63F 9/0612; A63F 9/08; G06Q 50/20; A61B 5/16; A61B 5/168
USPC ......... 434/322, 323, 350, 362, 236; 600/300
See application file for complete search history.

(56) References Cited

U.S. PATENT DOCUMENTS

| | | | |
|---|---|---|---|
| 5,533,727 A | 7/1996 | Demar | |
| 5,573,245 A | 11/1996 | Weiner et al. | |
| 5,683,082 A | 11/1997 | Takemoto et al. | |
| 5,709,604 A | 1/1998 | Coats et al. | |
| 5,882,258 A | 3/1999 | Kelly et al. | |
| 6,606,480 B1 | 8/2003 | Pezzuti et al. | |
| 6,632,174 B1 | 10/2003 | Breznitz | |
| 6,964,638 B2* | 11/2005 | Theodoracopulos | A61B 5/16 128/920 |
| 7,261,295 B2 | 8/2007 | Grant | |
| 7,294,107 B2* | 11/2007 | Simon | A61B 5/16 434/236 |
| 7,358,432 B2 | 4/2008 | Risley | |
| 7,540,615 B2 | 6/2009 | Merzenich et al. | |
| 7,557,287 B2 | 7/2009 | Wilson et al. | |
| 7,773,097 B2 | 8/2010 | Merzenich et al. | |
| 8,154,227 B1 | 4/2012 | Young et al. | |
| 8,435,037 B1* | 5/2013 | Davis | G09B 1/02 273/156 |
| 8,696,359 B2* | 4/2014 | Clark | A61B 5/16 434/236 |
| 8,821,242 B2 | 9/2014 | Hinman et al. | |
| 9,324,241 B2* | 4/2016 | Roots | G09B 7/00 |
| 2003/0008270 A1 | 1/2003 | Fleishman | |
| 2003/0059759 A1 | 3/2003 | Calhoun et al. | |
| 2005/0053904 A1 | 3/2005 | Shephard et al. | |
| 2006/0003298 A1 | 1/2006 | Hubert-Graff et al. | |
| 2006/0252014 A1* | 11/2006 | Simon | G09B 23/28 434/236 |
| 2006/0292531 A1 | 12/2006 | Gibson | |
| 2007/0031798 A1 | 2/2007 | Gottfried | |
| 2007/0166675 A1 | 7/2007 | Atkins et al. | |
| 2007/0254270 A1 | 11/2007 | Hersh | |
| 2007/0299802 A1 | 12/2007 | Kwok | |
| 2008/0003553 A1 | 1/2008 | Stark et al. | |
| 2008/0003558 A1 | 1/2008 | Chan et al. | |
| 2008/0084427 A1 | 4/2008 | Delahunt et al. | |
| 2010/0041001 A1 | 2/2010 | Delahunt et al. | |
| 2011/0097697 A1 | 4/2011 | Tharanathan et al. | |
| 2012/0046569 A1* | 2/2012 | Johnstone | A61B 5/0476 600/544 |
| 2012/0077160 A1* | 3/2012 | DeGutis | G09B 7/02 434/236 |
| 2013/0101975 A1 | 4/2013 | Hardy et al. | |
| 2013/0203027 A1* | 8/2013 | De Villers-Sidani | G09B 19/00 434/236 |
| 2013/0323704 A1 | 12/2013 | Hinman et al. | |
| 2014/0031116 A1 | 1/2014 | Hinman et al. | |
| 2014/0272840 A1* | 9/2014 | Peterson | G09B 19/00 434/236 |
| 2014/0315169 A1* | 10/2014 | Bohbot | G06F 19/3437 434/236 |
| 2014/0323190 A1 | 10/2014 | Hinman et al. | |
| 2014/0335487 A1 | 11/2014 | Hinman et al. | |
| 2015/0031003 A1* | 1/2015 | Kullok | G09B 7/02 434/236 |
| 2015/0031009 A1* | 1/2015 | Kullok | G09B 7/02 434/362 |
| 2015/0031010 A1* | 1/2015 | Kullok | G09B 7/02 434/362 |
| 2015/0086950 A1* | 3/2015 | Kullok | G09B 7/02 434/236 |
| 2015/0279226 A1* | 10/2015 | Harrison | G09B 7/04 434/353 |
| 2015/0282752 A1* | 10/2015 | Roots | A61B 5/168 434/236 |
| 2015/0294580 A1* | 10/2015 | Kullok | G09B 7/02 434/362 |
| 2015/0305663 A1* | 10/2015 | Roots | A61B 5/168 600/595 |

FOREIGN PATENT DOCUMENTS

| | | |
|---|---|---|
| KR | 1020080083244 A | 5/2008 |
| KR | 20080067055 A | 7/2008 |
| KR | 20100051309 A | 5/2010 |
| KR | 20100077540 A | 7/2010 |
| KR | 101000867 B1 | 12/2010 |
| WO | 2004006747 A2 | 1/2004 |
| WO | 2009051284 A2 | 4/2009 |
| WO | 2011028422 A1 | 3/2011 |
| WO | 2011030337 | 11/2011 |
| WO | 20120064999 A1 | 5/2012 |
| WO | 2013043781 A2 | 3/2013 |
| WO | 2013180845 A1 | 12/2013 |
| WO | 2014018313 A1 | 1/2014 |
| WO | 2014186280 A | 11/2014 |
| WO | 20140179278 A1 | 11/2014 |
| WO | 2015095488 A1 | 6/2015 |

OTHER PUBLICATIONS

Baker, "Music Moves Brain to Pay Attention", (Stanford Study) (Aug. 5, 2007).

Benikos, et al., "Short-term training in the Go/Nogo task: behavioural and neural changes depend on task demands", Int J Psychophysiol. 87 (3):301-312 (2013).

Cossins, "A Brain for Rhythm: A legendary rock and roll drummer teams up with a neuroscientist to explore the role of rhythm in brain function", The Scientist, Nov. 9, 2012.

Cuddy, et al., "Music, memory, and Alzheimer's disease: is music recognition spared in dementia, and how can it be assessed?", Medical Hypotheses 64(2):229-235 (2005).

Czerwinski, M., et al., "Automatization and Training in Visual Search", Amer. J. Psychol. 105, 271-315 (1992).

Donner, et al., "Involvement of the human frontal eye field and multiple parietal areas in covert visual selection during conjunction search," European Journal of Neuroscience 12(9) 3407-3414 (2001).

Duncan, et al., "Visual Search and Stimulus Similarity", Psychological Review 96(3) 4533-458 (1989).

Fischer, et al., "Effects of Daily Practice on Subitizing, Visual Counting, and Basic Arithmetic Skills", Optometry & Vision Development, 39(1) (2008).

Ho, et al., "Age, Skill Transfer, and Conjunction Search", Journal of Gerontology 57B(3) 277-287 (2002).

Ho, et al., "Plasticity of Feature-Based Selection in Triple-Conjunction Search", Canadian Journal of Experimental Psychology 57(1) 48-60 (2003).

Houben, "Overcoming the urge to splurge: Influencing eating behavior by manipulating inhibitory control", J Behav Ther & Exp Psychiat 42:384-388 (2011).

Houben, et al., "Resisting temptation: Decreasing alcohol-related affect and drinking behavior by training response inhibition", Drug and Alcohol Dependence, 116(1), 132-136 (2011).

Lobley, et al., "Perceptual learning in visual conjunction search", Perception 27 1245-1255 (1998).

Logie, et al., "Cognitive processes in counting", Journal of Experimental Psychology: Learning, Memory, and Cognition, 13(2), 310 (1987).

Manuel, et al., Brain Dynamics Underlying Training-Induced Improvement in Suppressing Inappropriate Action, J Neuroscience. 30(41):13670-13678 (2010).

Moreno et al., "ShortTerm Music Training Enhances Verbal Intelligence and Executive Function," Psychological Science (May 2011).

(56) References Cited

OTHER PUBLICATIONS

Muller, et al., "The functional neuroanatomy of visual conjunction search: a parametric fMRI study", NeuroImage 20, 1578-1590 (2003).
Ponds, et al., "Age differences in divided attention in a simulated driving task", J. Gerontology 43(6):151-156 (1988).
Railo, et al., "The role of attention in subitizing", Cognition, 107(1), 82-104 (2008).
Rueda, et al., "Training, maturation, and genetic influences on the development of executive attention", Proc. Natl Acad. Sci. 102(41):14931-14936 (2005).
Treisman, et al., "A feature-integration theory of attention", Cognitive Psychology 12 97-136 (1980).
Funny Games, Grid Memory, Aug. 21, 2011, http://www.funny-games.biz/grid-memory.html.
Improvememory.org, Memory Games, Mar. 12, 2012, http://www.improvememory.org/games.
Softschools.com, Path Memory, Nov. 4, 2011, http://www.softschools.com/games/memory_games/path_memory/.
Papaioannidis, 'Clockwork Brain—The best iPad and iPhone puzzle game is now available!', Applecasts (Feb. 20, 2012) (http://www.applecasts.com/clockwork-brain-best-iphone--puzzle-game).
Anvari, et al., "Relations among musical skills, phonological processing, and early reading ability in preschool children", J. Experimental Child Psychology 83:111-130 (2002).
Chan, "Rhythm Action Tap Sonic Offline (New Love Ritmo Theme)," http://freegalaxytip.blogspot.kr/2012/rhythm-action-tap-sonic-offlinenew-love.html (Dec. 13, 2012).
Crone, "Neurocognitive Development of Rational Reasoning", Dev. Sci. 12(1): 55-56 (2009).
Daneman, et al., "Individual differences in working memory and reading", Journal of Verbal Learning and Verbal Behavior 19(4): 450-466. doi:10.1016/S0022-5371(80)90312-6 (1980).
Ekstrom, et al., "Manual for Kit of Factor-Referenced Cognitive Tests," pp. 173-179, Princeton NJ: Educational Testing Service (1976).
Ira, "Track my train app review", Top Apps, http://www.topapps.net/blackberry/track-my-train-app-review.html (Feb. 26, 2013).
Jaeggi, et al., "Improving fluid intelligence with training on working memory", Proc. Nat'l Acad. Sci., 105 (19):6829-6833 (2008).
Ji et al., "Design and implementation of cognitive enhancement games for rehabilitation of old mans", Korea Info. Sci. Soc. J. 14: 239-246 (2008).
Kane, et al., "The role of prefrontal cortex in working-memory capacity, executive attention, and general fluid intelligence: An individual-differences perspective", Psychonomic Bulletin & Review 9(4), 637-671, doi:10.3758/ BF03196323 (2002).
Karbach, "How useful is executive control training? Age differences in near and far transfer of task-switching training", Developmental Science, 12:978-990 (2009).
Levitt, "Transformed Up-Down Methods in Psychoacoustics", J. Acoustical. Soc of Am. 49(2) 467-77 (1970).
Mack, "Pulse: volume One Steps into Rhythm Games with Original Music", Inside Mobile Apps, (May 13, 2011).
Matzen, et al., "Recreating Raven's Software for Systematically generating large numbers of Ravin-like matrix problems with normed properties," Behavior Research Methods 42(2):525-541 (2010).
Nicologic; (https://webarchive.org/web/20081111131911/http://www.nicologic.fr/index.php?LANGUE=ENG&MENU=MAIN) Nov. 11, 2008.
Nosek, et al., "The go/no-go association task", Social Cognition 19(6):625-666 (2001).
Rajender et al., "Efficacy of cognitive retraining techniques in children with attention deficit hyperactivity disorder", German J. Psychiatry 14(2):55-60 (2011).
Rogers, "The cost of a predictable switch between simple cognitive tasks", Journal of Experimental Psychology: General, 124:207-231 (1995).
Salthouse, et al., "Age and Experience Effects in Spatial Visualization", Developmental Psychology 26(1):128-136 (1990).
Shepard, et al., "A Chronometric Study of Mental Paper Folding," Cognitive Psychology, 3(2):228-243 (1972).
Sheridan, "Review: candy train-full steam ahead", posted in Endless, Games, iPad, iPhone (2011); http://applenapps.com/review/candy-train#,VEXvrSKsUcY.
Sohlberg, "Effectiveness of an attention-training program," J Clin Exp Neuropsychol 9 (2):117-30 (1987).
Stroop, "Studies of interference in serial verbal reactions", J. of Exp. Psych. 18 (6):643-662 (1935).
Turner, et al., "Is working memory capacity task dependent?" J. Memory and Language, 28(2):127-154. (1989).
Pedia Staff Blog, Aug. 2011, Music Therapy and Speech Language Pathology—A Collaboration (Parts 1 & 2, Rachel See Smith, MA, MTBC, Board Certified Music Therapist (http://www.pediastaff.com/blog/guest-blog-music-therapy-and-speech-language-pathology-a-collaboration-parts-1-2-4364).
Posner, et al., "How arts Training Improves Attention and Cognition" available from http:// dana.org/news/cerebrum /detail.aspx?id=23206 (Sep. 14, 2009).
Lumos Labs, Addition Storm.
Spelke, et al. "Skills of undivided attention" Cognition 4(3):215-230 (1976).

* cited by examiner

PHYSICALLY INTUITIVE RESPONSE INHIBITION TASK FOR ENHANCING COGNITION

RELATED CASES

This application claims priority to U.S. Provisional Patent Application No. 61/841,590, entitled A PHYSICALLY INTUITIVE RESPONSE INHIBITION TASK FOR ENHANCING COGNITION, filed on Jul. 1, 2013, which application is incorporated herein by reference.

INTRODUCTION

Response inhibition, also called inhibitory control, refers to the ability to prevent actions in inappropriate contexts. It involves the suppression of intended or ongoing cognitive or motor responses, which allows individuals to flexibly adapt to a changing environment. Inhibitory control is an important component of attention, the ability to selectively concentrate on one aspect of the environment while ignoring others, and executive functioning, the higher-order cognitive ability encompassing the ability to control one's thinking Enhancing inhibitory control is highly desirable in order to avoid negative outcomes associated with impulsivity, or reaction without consideration of consequences.

Traditionally, in the field of psychology, two related paradigms have been used to measure response inhibition, Go/No-Go and Stop-Signal Reaction Time ("SSRT"). In both types of task design, subjects are encouraged to rapidly respond to a "go" stimulus, while withholding response to an alternate "no-go" stimulus in the former case or an independent "stop" stimulus in the latter. Individuals who have difficulty holding back their response in these tasks are likely to have poor inhibitory control more generally.

In addition to their use as measurements, Go/No-Go and SSRT paradigms have been used to improve inhibitory control in general and to specific adverse stimuli such as alcohol and food, targeting populations susceptible to overconsumption. See, Benikos, N., Johnstone, S. J., & Roodenrys, S. J. (2013). "Short-term training in the Go/Nogo task: behavioural and neural changes depend on task demands". *Int J Psychophysiol.* 87 (3): 301-312; Manuel, A. L., Grivel, J, Bernasconi, F., Murray, M. M., & Spierer, L. (2010). "Brain Dynamics Underlying Training-Induced Improvement in Suppressing Inappropriate Action". *J Neuroscience.* 30(41): 13670-13678; Houben, K., Nederkoorn, C., Wiers, R. W., & Jansen, A. (2011). "Resisting temptation: Decreasing alcohol-related affect and drinking behavior by training response inhibition". *Drug and Alcohol Dependence,* 116(1), 132-136; and Houben, J (2011). "Overcoming the urge to splurge: Influencing eating behavior by manipulating inhibitory control". *J Behav Ther & Exp Psychiat* 42: 384-388. These promising approaches demonstrate the appeal of response inhibition training; however, they are not without their limitations. In particular, none have included modifying timing parameters to adapt to users' improvements, and instead they keep the parameters fixed. Further, including more natural, active stimuli increase ecological validity, understanding, and engagement in the task.

SUMMARY OF THE INVENTION

Cognitive training exercises are described that are conducted on a computer device configured to train response inhibition in an intuitive, engaging, and adaptively challenging way to enhance cognition. These exercises engage users in a task where they are presented with a number of locations on the user interface display on which various parts of robots appear within a factory-like setting. Users must quickly respond to the stimuli presented on the user interface display in order to build as many robots as possible, but also endeavor to ignore parts that should not be used.

A method and system for enhancing a cognitive ability of a user is disclosed, which may comprise: conducting, via a user interface display of a user computing device, a training session which may comprise presenting, via the user interface display of the user computing device, a variable stimuli go/no-go behavior response exercise, which may comprise establishing, via the user interface display of the user computing device, an assembly platform presented on the user interface display containing an outline of component parts of a final assembled item; presenting, via the user interface display of the user computing device, a plurality of component delivery locations on the user interface display; delivering, via the user interface display of the user computing device, a component corresponding to at least one of the plurality of components of the final assembled item to at least one of the component delivery locations on the user interface display; allowing the user to select or not select, via the user interface display of the user computing device, the component on the at least one of the plurality of component delivery locations on the user interface display according to at least one selection criteria; and scoring, via the user computing device, the correctness of the user selecting or not selecting the component according to the at least one selection criteria.

The method and system may further comprise presenting, via the user interface display of the user computing device, a representation of an outline of the assembled components of the final assembled item. The method and system may further comprise wherein the at least one selection criteria includes one of whether the component fits into the representation of the outline of the assembled components of the final assembled item, whether the component has been indicated to be ready for assembly to the final assembled item, whether the component has already been assembled onto the final assembled item and whether the component is a broken component. The method and system may further comprise presenting to the user, via the user interface display of the user computing device, an indication that a component is about to be delivered to the one of the plurality of component delivery locations on the user interface display.

The method and system may further comprise presenting to the user, via the user interface display of the user computing device, at least one of a "go" and a "no-go" signal upon the delivery of the component to the component delivery location on the user interface display platform. The method and system may further comprise determining, via the user computing device, a rate of delivery of components to the at least one of the component delivery locations on the user interface display according to a determined level of performance of the user. The method and system may further comprise upon the user completing the assembly of a first assembled item, presenting the user, via the user display of the user computing device, with a second different final assembled item to be assembled. The method and system may further comprise signaling the user, via the user interface display of the user computing device, that the component delivered to the at least one of the component delivery locations on the user interface display is ready for assembly onto the final assembled item.

A non-transitory machine readable medium is also disclosed storing instructions that, when executed by a computing device, can cause the computing device to perform a method, which may comprise: conducting a training session which may comprise: presenting a variable stimuli go/no-go behavior response exercise, which may comprise: establishing an assembly platform containing an outline of component parts of a final assembled item; presenting a plurality of component delivery locations on the user interface display; delivering a component corresponding to at least one of the plurality of components of the final assembled item to at least one of the component delivery locations on the user interface display; allowing the user to select or not select the component on the at least one of the plurality of component delivery locations on the user interface display according to at least one selection criteria; and scoring the correctness of the user selecting or not selecting the component according to the at least one selection criteria. The method may further comprise wherein the at least one selection criteria includes one of whether the component fits into the representation of the outline of the assembled components of the final assembled item, whether the component has been indicated to be ready for assembly to the final assembled item, whether the component has already been assembled onto the final assembled item and whether the component is a broken component.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 13 is an illustration of a game screen showing a "stop" signal and an incorrect response on the right pedestal; in this illustration, the left pedestal has not been responded to;

DETAILED DESCRIPTION OF THE INVENTION

A goal of the cognitive skill training apparatus and method of the presently disclosed subject matter may be to require a user to quickly and repeatedly react to incoming signals, including, ignoring incoming signals indicated to the user to be such as should be ignored, a so-called "no-go" signal. A core gameplay mechanism may be to press one of three buttons that corresponds to a "go" signal as quickly as possible, while holding back a response to those with a "no-go" signal. According to aspects of the disclosed subject matter the go signals may be, for example, the presentation of component parts of a multi-part item to be assembled, such as a robot, that the user must assemble into the finally assembled item (robot), as is illustrated, by way of example in FIG. 1.

Figure 1:
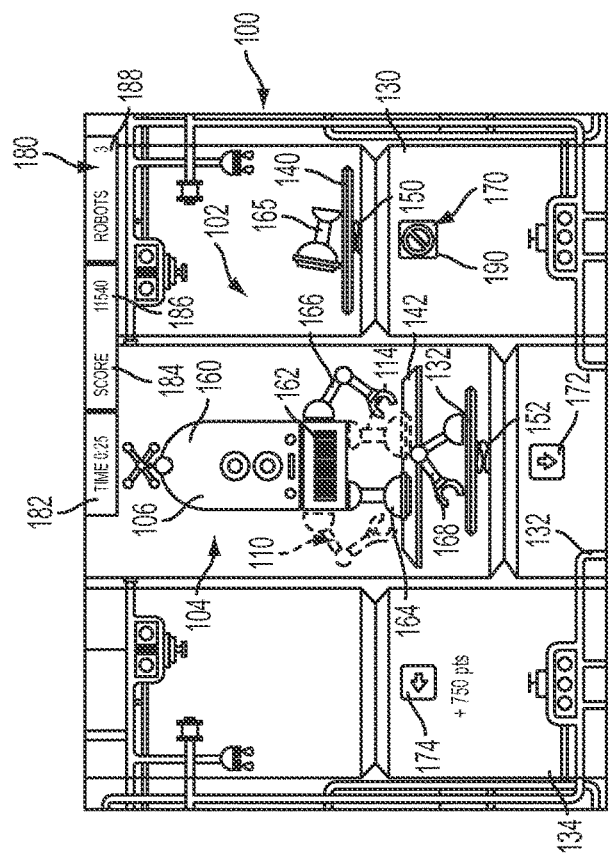
FIG. 1 is an illustration of a main game screen depicting "go" (center) and "no-go" (right) stimuli.

Turning now to FIG. 1, there is shown a screen display 100, which may illustrate an assembly area background 102, illustrated here as an example, as a robot assembly area 102. The robot assembly area 102 can include an assembled component outline 104, such as that of a robot to be completed, which can include, as illustrated a shadow representation of components requiring assembly. The robot outline 104 of the robot to be assembled can be more completely seen in FIG. 5. The assembled robot outline 104 can include, e.g., a right arm outline 110, a left arm outline 112 (not shown in FIG. 1, shown in FIG. 5), a left leg outline 114, a right leg outline 116 (not shown in FIG. 1, shown in FIG. 5), a head outline 106 and a torso outline 108 (not shown in FIG. 1, shown in FIG. 5).

Figure 6:
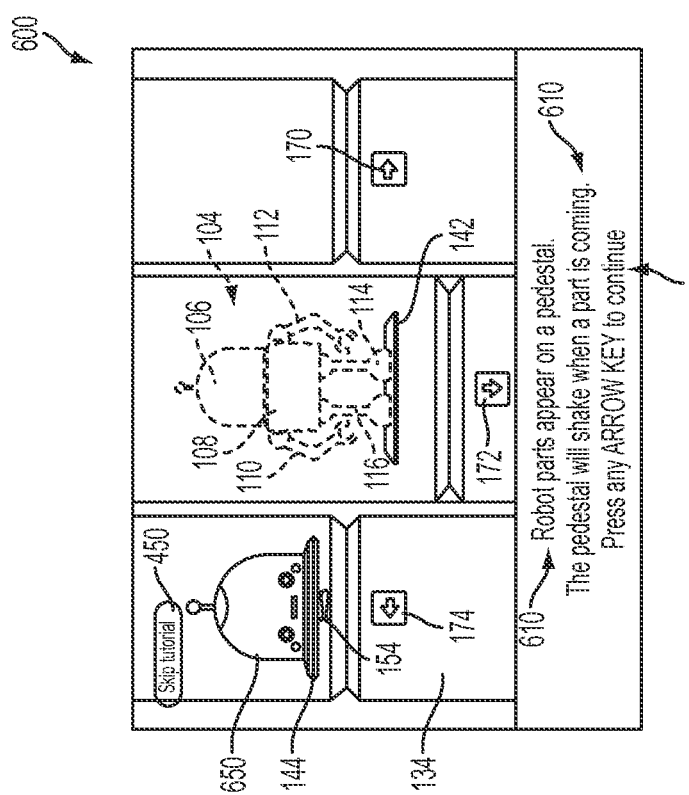
FIG. 6 is an illustration of a tutorial screen describing a game mechanism wherein parts can appear on any of the three depicted pedestals.

The assembly area 102 can also include an illustration of a first component delivery pedestal 130, to the right of the robot when the user is facing the robot which can have a right delivery tray 140, with a right tray spring 150, a center component delivery pedestal 132, which can have a center delivery tray 142, with a center tray spring 152, and a second component delivery pedestal 134, to the left of the robot when a user is facing the robot which can have a left delivery tray 144 (not shown in FIG. 1, shown in FIG. 6) and a left tray spring 154 (not shown in FIG. 1, shown in FIG. 6). As is shown in FIG. 1, a left robot leg 165 may be situated on the right delivery pedestal tray 140, but not be indicated to be ready for assembly because the right delivery pedestal tray spring 150 is not extended as yet. Thus, the right delivery pedestal indicator 170 can be displayed as a "no-go" symbol, such as the international "No" symbol (a circle with a diagonal line through it). Illustrated on the center delivery pedestal tray 142, e.g., is the right robot arm 168, and indicated to be ready for assembly because the center tray spring 152 is extended, and thus the pedestal selection indicator 172, showing the keyboard down arrow is ready for assembly by the user taping the keyboard down arrow.

Also illustrated in FIG. 1 is a partially assembled robot 104, including a robot head 160, a robot body 162, a right robot leg 164 and a left robot arm 166. It will be appreciated that the left robot leg outline/shadow 114 and the right robot arm outline/shadow 110 remain, indicating those components remain to be added to the assembly of the robot 104. Therefore, the right robot arm 168, positioned on the center delivery pedestal tray 142, remains unassembled and awaits assembly, and the left robot leg 165 remains unassembled, but is positioned on the right delivery pedestal tray 140, which does not have the center tray spring 152 extended, and therefore, is indicated by the "No-Go" sign 190 to not be presently awaiting assembly.

Also illustrated in FIG. 1 is an information tab 180, which may include a time indicator 182 for indicating for example, the relapsed time of the session for building robots or the elapsed time for building the current robot, and a score indicator 184 indicating the total points scored by the user 186 as well as a number completed indicator 188 indicating how many robots the user has completed assembling during the current training session.

Figure 7:
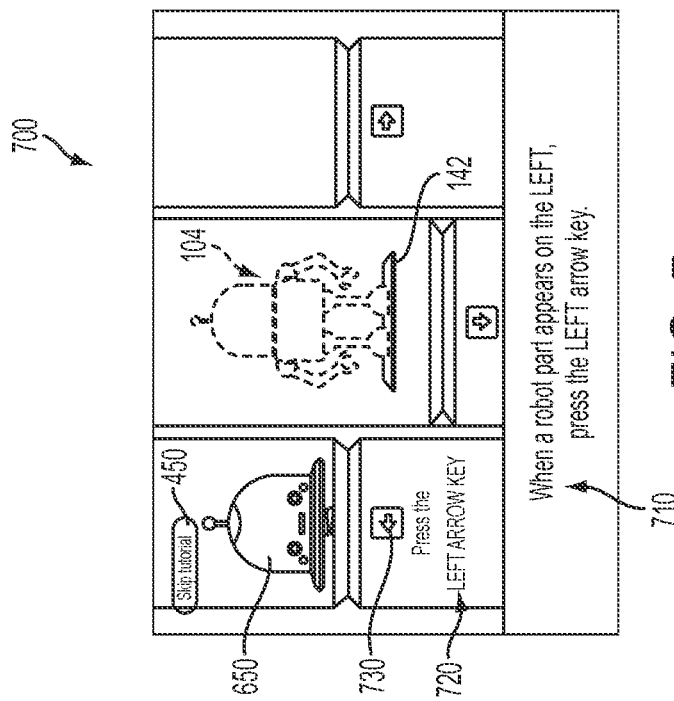
FIG. 7 is an illustration of a tutorial screen demonstrating a "go" signal wherein pressing an arrow key triggers a response on the pedestal labeled with that key.

Other representations of a "go" signal could be used. As an example, the pedestal indicator, for the left pedestal 134 could be illuminated, as shown in FIG. 7. The "no-go" signal may be depicted by a standard international "no" sign, as illustrated in FIG. 1 because the component on the tray is a duplicate, wrong, or broken robot part, or the timing for the assembly is not ready which here is indicated by the right tray spring 150 not being extended. Other implementations are not limited in modality, and for instance, the system and method of the disclosed subject matter could use auditory or vibratory cues to signal a "go" or "no-go" trial, in addition to or instead of the visual representation presented, because, for example, the part is already on the robot, the part is broken is some fashion, or the part is not consistent with the particular structure and composition of the current robot under construction, as indicated by the outline of the finally assembled item, or it is not the proper time for the component to be assembled onto the robot, etc.

As explained above, each component part may be paired with a keyboard button, such as left and right or down keyboard arrows, by the part being placed on the associated delivery pedestal 130, 132, 134. Other implementations need not be limited to just three keys, and alternate methods of signaling, additional or different keys or other user interface elements such as icons that can be pressed on a touch screen or by a mouse click or by gesturing in the desired direction on a touch screen or to a 3D input device (e.g. a Microsoft® Kinect or a Nintendo Corporation Wii® Bar responsive to a Wii® Wand). Before presenting each robot part, the system and method may indicate to the user that an event requiring a response is upcoming, by, for example, depicting a pedestal where the incoming object will appear can be made to shake=in order to assist and/or encourage the user to respond quickly. Also as noted above, the component part may appear on the pedestal on an un-extended tray, which may vibrate or the system may make a sound, or both, just before the tray is extended and thereby putting the component part in a condition to be selected by the user for assembly onto the robot.

Figure 2:
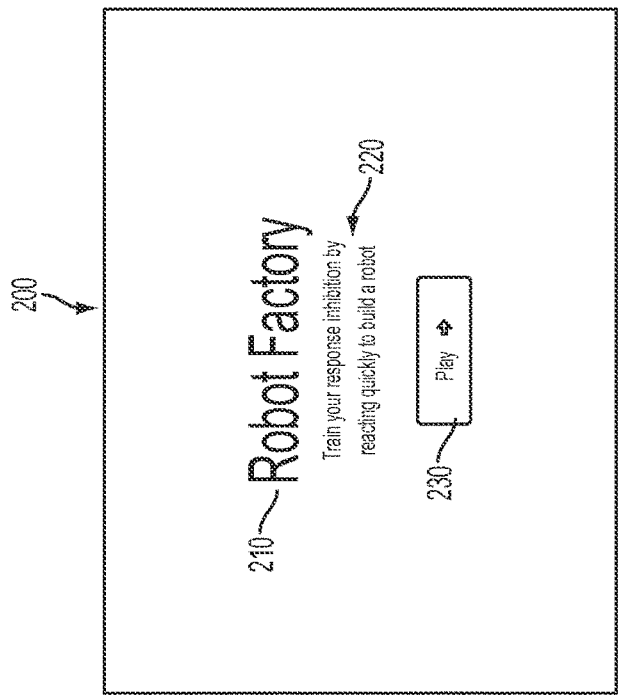
FIG. 2 is an illustration of a title screen.

The user may be introduced to the training exercise via a title screen, as illustrated by way of example in FIG. 2 introducing a short interactive tutorial describing the game-play elements. The user computing device displays a game title screen display, such as is illustrated by the screen display 200, with an identification of the game 210 such as "Robot Factory." A short summary of what the game entails 220 is provided, such as "train your response inhibition by reacting quickly to build a robot." Thereafter, the user may proceed to play the game by activating the play button 230.

Figure 9:
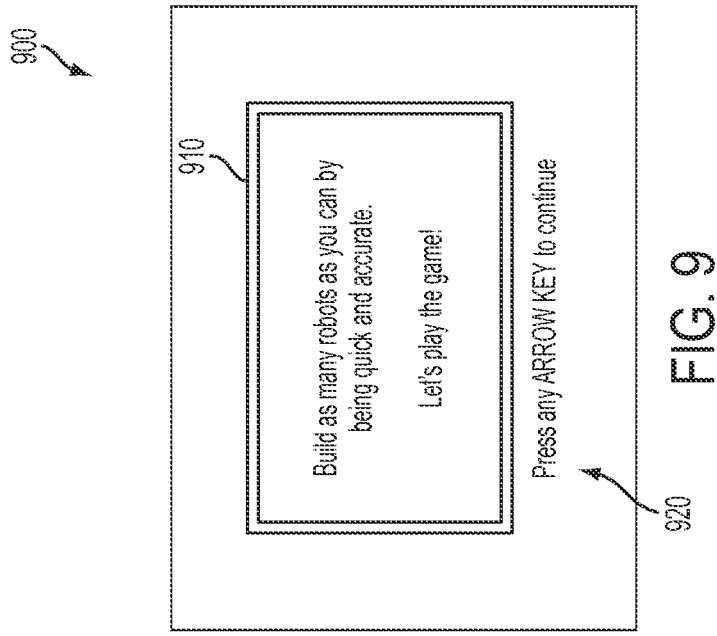
FIG. 9 is an illustration of a tutorial screen describing game strategy.

As discussed below, a short interactive tutorial may begin, such as illustrated in FIGS. 4-9. The tutorial may prompt the user to complete a series of simple game configurations with guided messages and prompts indicating for example, input method and gameplay flow. Gameplay features, such as examples of "go" (FIG. 7) and "no-go" (FIG. 8) signals may be presented in sequence. After these examples are completed, the player may then be invited to start the game (FIG. 9). The tutorial may be recalled in the future if a player needs to be reminded how to play and dismissed by the user if not needed. The tutorial recall may be requested by the user or determined by the program based on other criteria as well, such as the failure by the user to meet a previous performance threshold, which suggests a lack of understanding of the task or a need for further practice.

Figure 3:
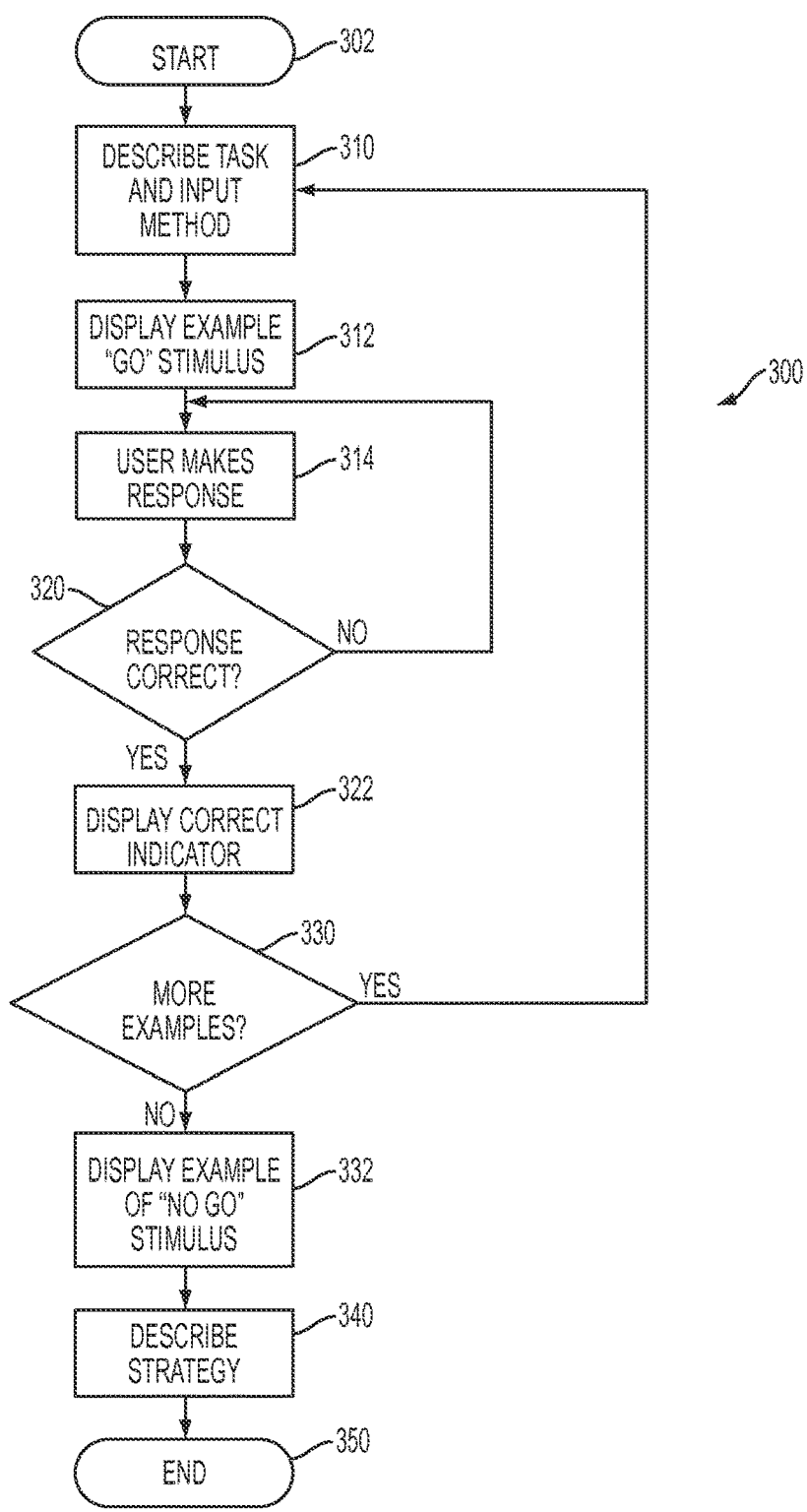
FIG. 3 is a flow chart illustrating a tutorial flow.

FIG. 3 shows an illustrative tutorial process flow 300. The process flow diagram includes a "start" block 302, followed by a "Describe task and input method" block 310, which is followed by a "Display example 'Go' stimulus" block 312 and a "user makes response" block 314. After a "Response correct?" determination block 320, if the response was not correct (NO) then the process flow returns to block 314 and the user is allowed to make another attempt at a correct response. If the response is correct (YES) then the process flow goes to "Display correct indicator" block 322, and the correct response indicator is displayed on the user interface display by the user computing device. A "More examples?" decision block 332 returns the process flow to block 310 if more examples are available to show to the user (YES) and proceeds to a "Display example of 'No-Go' stimulus" block 332 if more examples are not available to show the user (NO). Following block 332, a "Describe strategy" block 340 causes the display of a strategy to the user, followed by a process flow "end" block 350.

Figure 4:
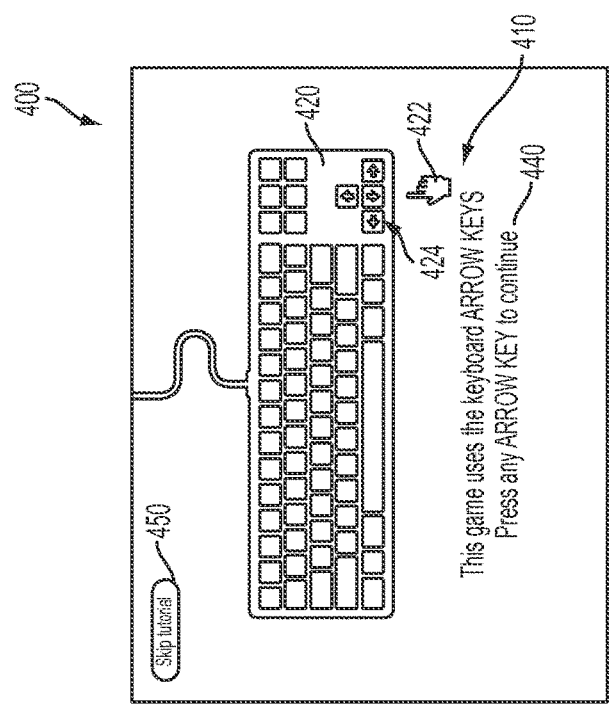
FIG. 4 is an illustration of tutorial screen describing an input method.

Turning now to FIG. 4 there is shown interface tutorial screen display 400 for describing user input to the user. FIG. 4 can include a tutorial text 410, such as, "This game uses the keyboard ARROW KEYS." Also shown in the screen display 400 can be a keyboard representation 420 and a user hand representation 422, highlighted along with the keyboard arrow keys 424. Also shown is a "Press any ARROW KEY to continue" instruction text block 440 and a "Skip tutorial" button 450.

Figure 5:
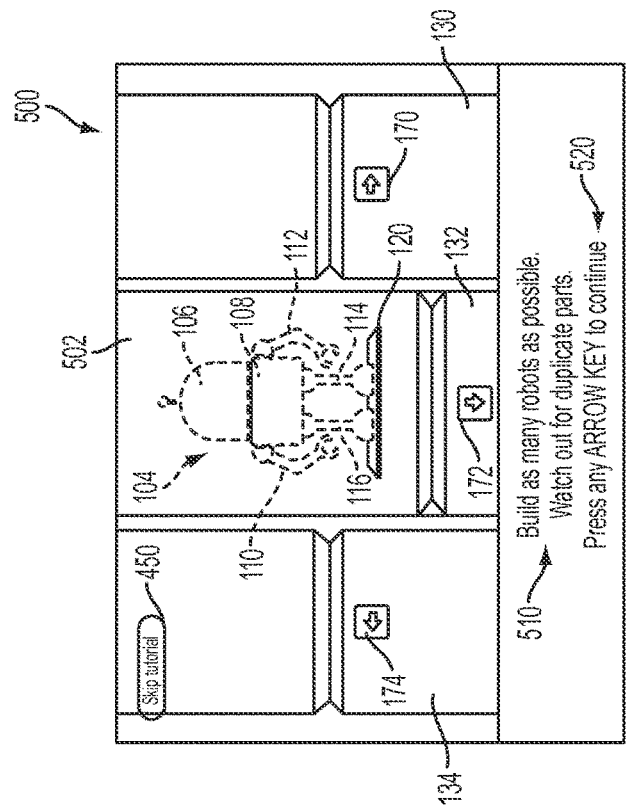
FIG. 5 is an illustration of a tutorial screen which describes a goal.
Figure 8:
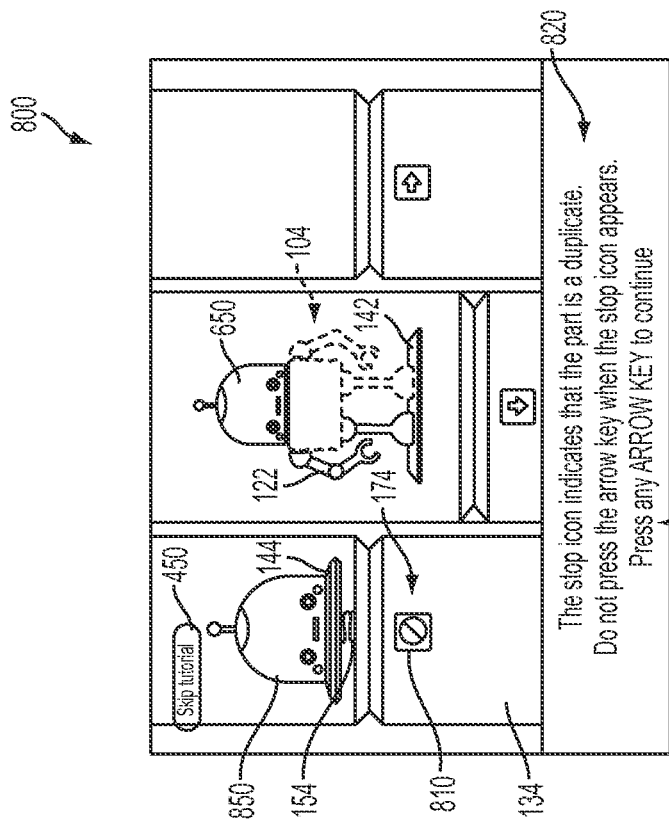
FIG. 8 is an illustration of a tutorial screen demonstrating a "stop" signal.

FIG. 5 shows a game start initial screen display 500, which can be displayed to the user during the tutorial as well as the following screen displays in FIGS. 6-8, e.g. to explain a goal of the game playing session. The screen display 500 can include, by way of example, game play mechanism elements, such as have been discussed with regard to FIG. 1 above, including an assembly area background 102, illustrated, as noted above, as a robot assembly area 102. The robot assembly area 102 can include a robot component assembly illustration 502, which can, e.g., have an assembled component outline 104, such as that of a robot to be completed on a center delivery tray 142, which can include, as illustrated, an outline/shadow representation of the component. The assembled entire robot outline/shadow 104 can be more completely seen in FIGS. 5 and 6. The assembled robot outline/shadow 104, can include, e.g., a right arm outline 110, a left arm outline 112, a left leg outline 114, a right leg outline 116, a head outline 106 and a torso outline 108. Also seen are the right, center and left pedestals, 130, 132 and 134, with associated keyboard arrow keys 170 (right), 172 (down) and 174 (left). The screen display 500 can also include a tutorial text "Build as many robots as possible. Watch out for duplicate parts." 510 and an instruction text block 520 "Press any ARROW KEY to continue." At any time, the user can press the "Skip tutorial" button 450 to leave the tutorial.

Turning now to FIG. 6 there is shown a screen display 600, which can, e.g., describe a game playing mechanism wherein parts can appear on any of three depicted component delivery pedestals 130, 132 and 134. The screen display 600 can include, by way of example a robot head 650 for assembly, e.g., appearing on the left component delivery pedestal 134 on a delivery tray 144, with the left delivery tray spring 154 extended, all of which, according to aspects of an embodiment of the disclosed subject matter can indicate to the user that the robot head, if not, e.g., a duplicate of a part already assembled onto the robot, broken, etc., is ready for assembly onto the robot. Also, as can be seen in FIG. 6 there is no stop sign on the left key arrow indicator 174, which would according to aspects of embodiments of the disclosed subject matter an inhibitor of the user tapping the left arrow key on the user computing device keyboard. The screen display 600 can also include a tutorial text block 610 "Robot parts appear on a pedestal. The pedestal will shake when a part is coming." It will be understood that other ways can be used to indicate to the user that the particular part on a particular pedestal is ready for assembly, assuming other criteria are met, such as, not being a duplicate part or a broken part, etc. As an example, the shaking of the pedestal and subsequent appearance of the part, without the alternative or additional use of the tray 144 and its extension using the spring, e.g., left tray spring 154. Other readiness indicator signals will be apparent. The screen display can also have an instruction text 620 "Press any ARROW KEY to continue."

As can be seen in FIG. 7, showing an illustration of a tutorial screen 700 demonstrating another "go" signal, wherein pressing an arrow key triggers a response on the pedestal labeled with that key. As can be seen in the screen display 700 a tutorial text block 710 can inform the user "When a robot part appears on the LEFT, press the left arrow key," and an instruction text block 720 "Press the LEFT ARROW KEY." In so doing the tutorial can show the user, as can also occur during game play, the robot head 650 will be assembled onto the robot under assembly. As also indicated in the screen display 700, a highlighted LEFT ARROW KEY indicator 730 can be a part of the "go" signal to the user. It will be understood that a sub-group of all of the just noted "go" signals can be utilized, or some other(s) may be chosen.

An example can be seen in the screen display 800 of FIG. 8 where, according to some embodiments, a robot head 850 appears ready for assembly because the tray 144 is extended on its left tray spring 154, but the pedestal 134 arrow key designator 174 can be displayed with the "No-Go" symbol 810. The screen display 800 may also include a tutorial text block 820 "The stop icon indicates that the part is a duplicate. Do not press the arrow key when the stop icon appears." Also an instruction text block 830 "Press any ARROW KEY to continue" can be seen in the screen display 800. Turning now to FIG. 9 there is shown a tutorial screen display 900 indicating a game strategy. The game introduction screen display 900 can include game introduction text block 910 "Build as many robots as you can by being quick and accurate. Let's play the game!" The screen display 900 can also include an instruction text block 920 "Press any ARROW KEY to continue."

Figure 10:
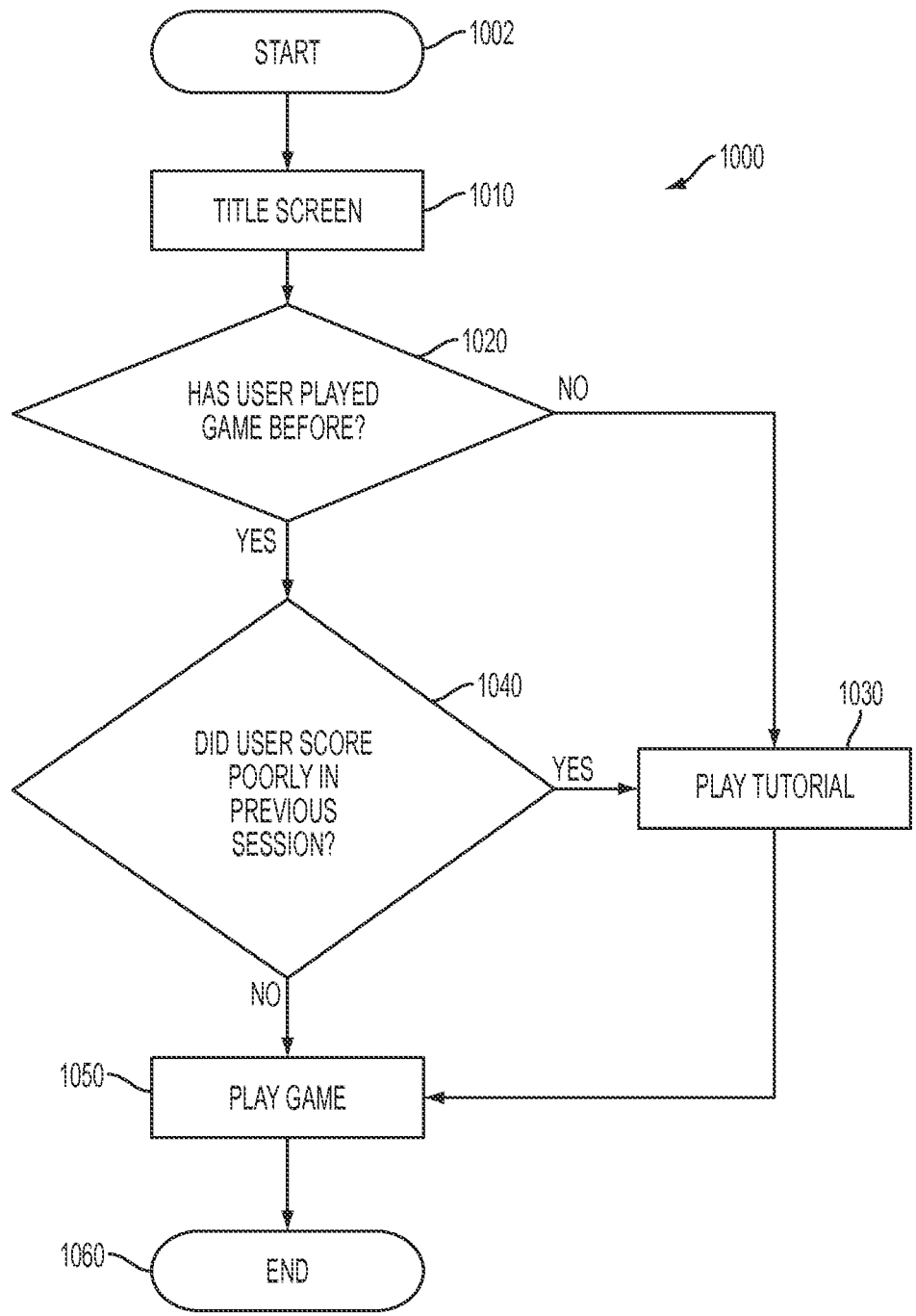
FIG. 10 is an illustration of a flow directing users to play a tutorial.

FIG. 10 shows a process flow diagram 1000 for the process being performed on the user computing device for conducting a tutorial for the user. The process flow diagram 1000 can include a "start" block 1002 followed by a "title screen" display block 1010, whereby the user computing device will be caused to display game title screen display, such as is illustrated by the screen display 200 of FIG. 2. Then in a decision block 1020 the user computing device makes a decision as to "Has user played game before?" If the answer is NO, then the process flow proceeds to a "play tutorial" block 1030, whereby some or all of the tutorial screen displays such as are illustrated in FIGS. 4-8 can be displayed to the user for interaction with the user. The process flow diagram 1000 then proceeds to a decision block 1040, "Did user score poorly in previous session?" If the answer is YES then the process flow 1000 proceeds to the play tutorial block 1030 and if "no" to the "play game" block 1050. After the tutorial is played for the user in block 1030 the process flow also proceeds to the play game block 1050. The process flow diagram 900 can conclude with an "end" block 1060.

Figure 11:
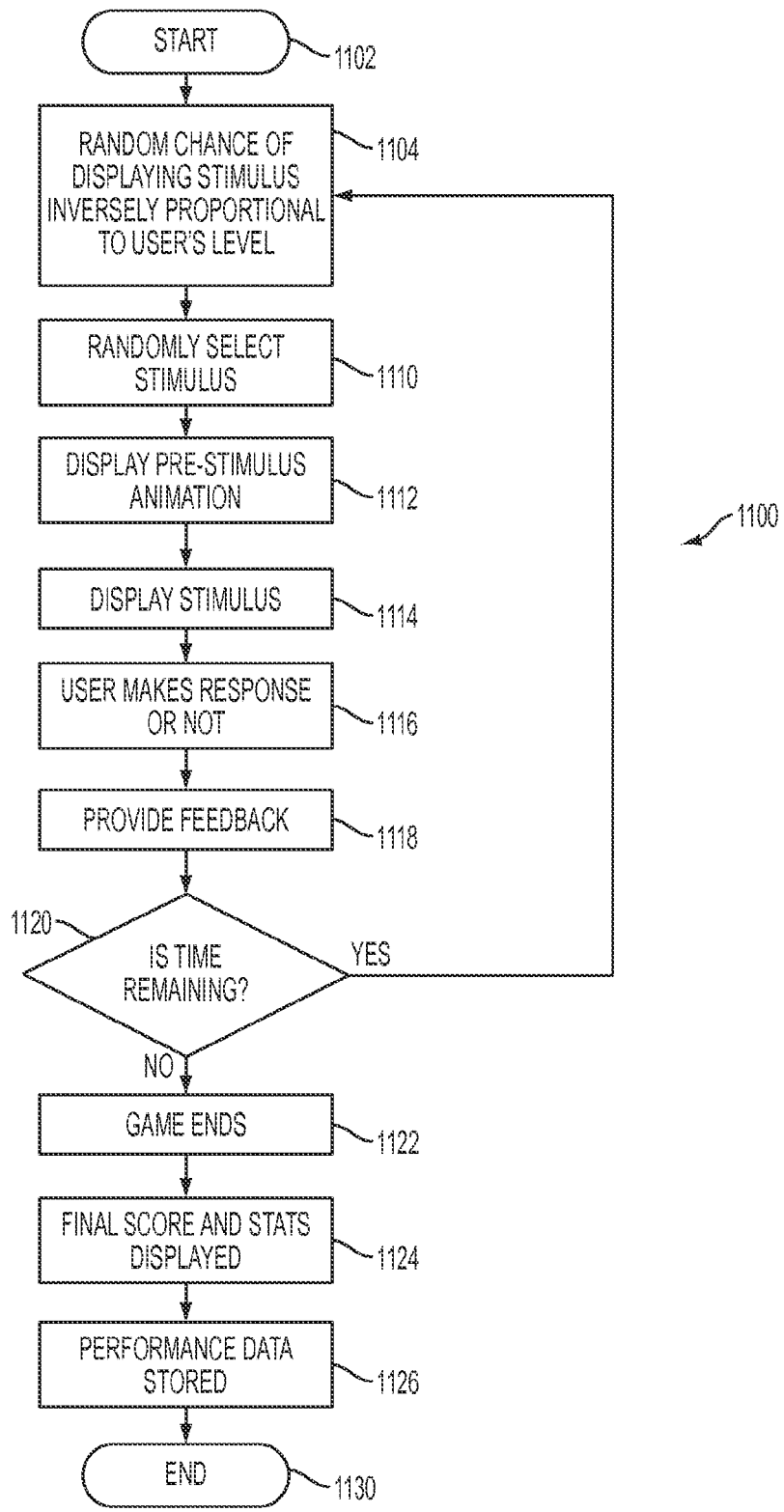
FIG. 11 is an illustration of a game flow.

Turning now to FIG. 11, there is shown a game play process flow diagram 1100. The game play flow diagram 1100 can include a "start" block 1102. The start block 1102 can be followed by a "Random chance of displaying stimulus inversely proportional to user's level" block 1104, wherein the user computing device can set or recover from storage a random chance of displaying a "Go-No Go" stimulus to the user, which, as noted, can be based on some analysis of the user's prior achieved level of performance of a game play session. When in the course of game play, it is indicated according to this random chance dictates a stimulus should be selected—as an example, there is some random variable time period between selection of stimuli to present to the user, the process flow proceeds to the "randomly select stimulus" block 1110, wherein a stimulus is randomly selected, e.g., a robot component part appears in the screen display, e.g., according to whatever protocol for anticipating for the user and conducting for the user the display of the robot component part is in place, i.e., by the process flow proceeding to a "Display pre-stimulus animation" block 1112 and then to a "Display stimulus" block 1114. The process flow then determines whether the user makes a response or not, e.g., taps a keyboard arrow key in a "User makes response or not" block 1116, depending on the correctness or incorrectness of the user response, in "Provide feedback" block 1118, feedback is provided to the user. In a decision block 1120 the process flow determines whether there "Is time remaining?" If not (NO) the game ends in block 1122. Thereafter the process flow can display to the user game play information, e.g., final score and statistics in block 1126. Performance data can be stored by the user computing device in block 1126, and this part of the process flow can end in block 1130. If time is remaining (YES), then the process returns to block 1104.

As can be seen from FIG. 11 a game play flow can be based on presenting trials at randomized times for a user to respond to or ignore which adapt to user behavior. Stimulus appearance rates may be adjusted based on user performance, which can optionally can be optimized, such that, over time, a user can reduce reaction time to "go" trials, while decreasing the number of responses to "no-go" trials over the course of a given game playing session. After each response, the probability that the next trial will appear can be modified by the system and method of the disclosed subject matter. As examples, if the user has responded more quickly than the system and method expected, then the probability may be increased by the user computing device and if the user has responded more slowly than the system and method expected, the probability may be decreased by the user computing device. If the user has responded when no stimulus calling for response was present, such as having responded to a "no-go" trial the probability may be decreased. The pre-stimulus warning, such as a pedestal shake, tray extension, or the like, and shake time, stimulus duration, and time between when the "go" and "no-go" stimulus appears can be set to a constant time period or can adaptively be adjusted during the game or between games, as an example, based on performance using similar logic to the probability adjustments just noted or by other methods.

The occurrence of a "no-go" trial can be increased in probability after the occurrence of a "go" trial and can be decreased in probability after a "no-go" trial in order to balance the number of "go" and "no-go" stimuli appropriately for effectiveness of the engagement of the user. Other adaptive methods, such as using a Bayesian adaptive algorithm to predict the optimal presentation times and probabilities of a given stimuli presentation for a given user at a given time, are possible according to aspects of the disclosed subject matter. The parameters used may be derived from measured human psychophysical properties, such as behavioral and neural changes relating to inhibitory control tested for over a population of individuals, or the user in particular.

Figure 13:
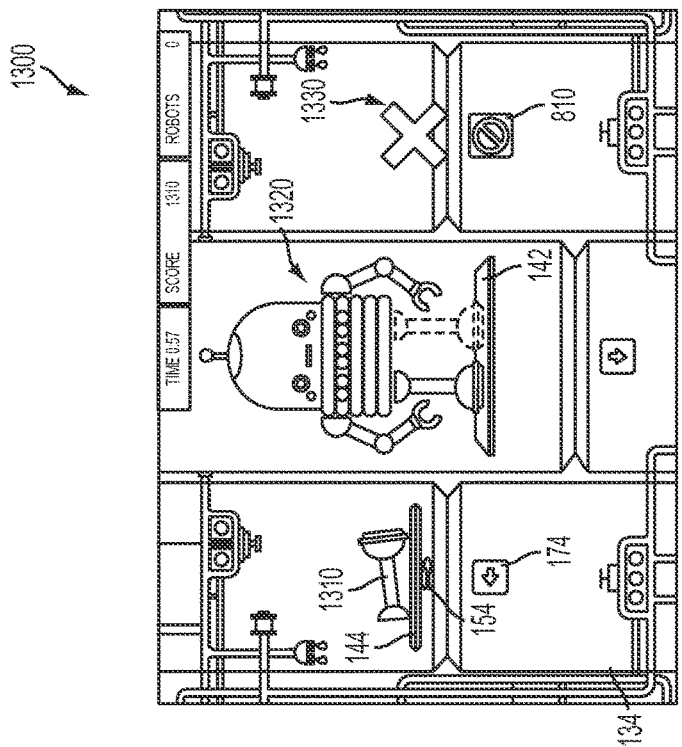
Figure 12:
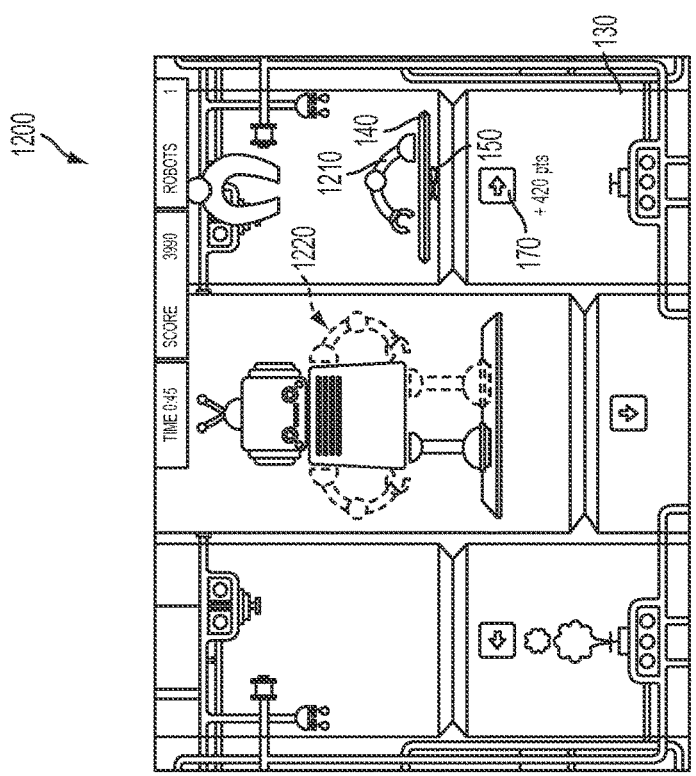
FIG. 12 is an illustration of a game screen showing a correct response from a user; a score addition can be labeled on a pedestal and the part can be picked up by a magnetic arm and moved to the character, illustrated as a robot, in the center of the screen.

After each user response, a correct or incorrect indicator may be presented, e.g., visually or auditorily or both, as shown in the screen displays 1200 and 1300 of FIGS. 12 and 13, such by simply leaving the screen display 1200 unchanged, and perhaps using an audible signal for a correct response, or, as shown in the screen display 1300, utilizing an incorrect signal, "X", as shown over the right component delivery pedestal 130, where the "No-Go" signal 810 had been displayed and the user tapped the right arrow key on the user device keyboard user interface. The screen display 1200 can include a right arm robot component 1210 stimulus, ready for assembly and a robot being assembled 1220. FIG. 13 can include a robot left leg component part stimulus 1310, a robot being assembled 1320, a no-go signal 810 and a wrong selection feedback "X" 1330.

Figure 14:
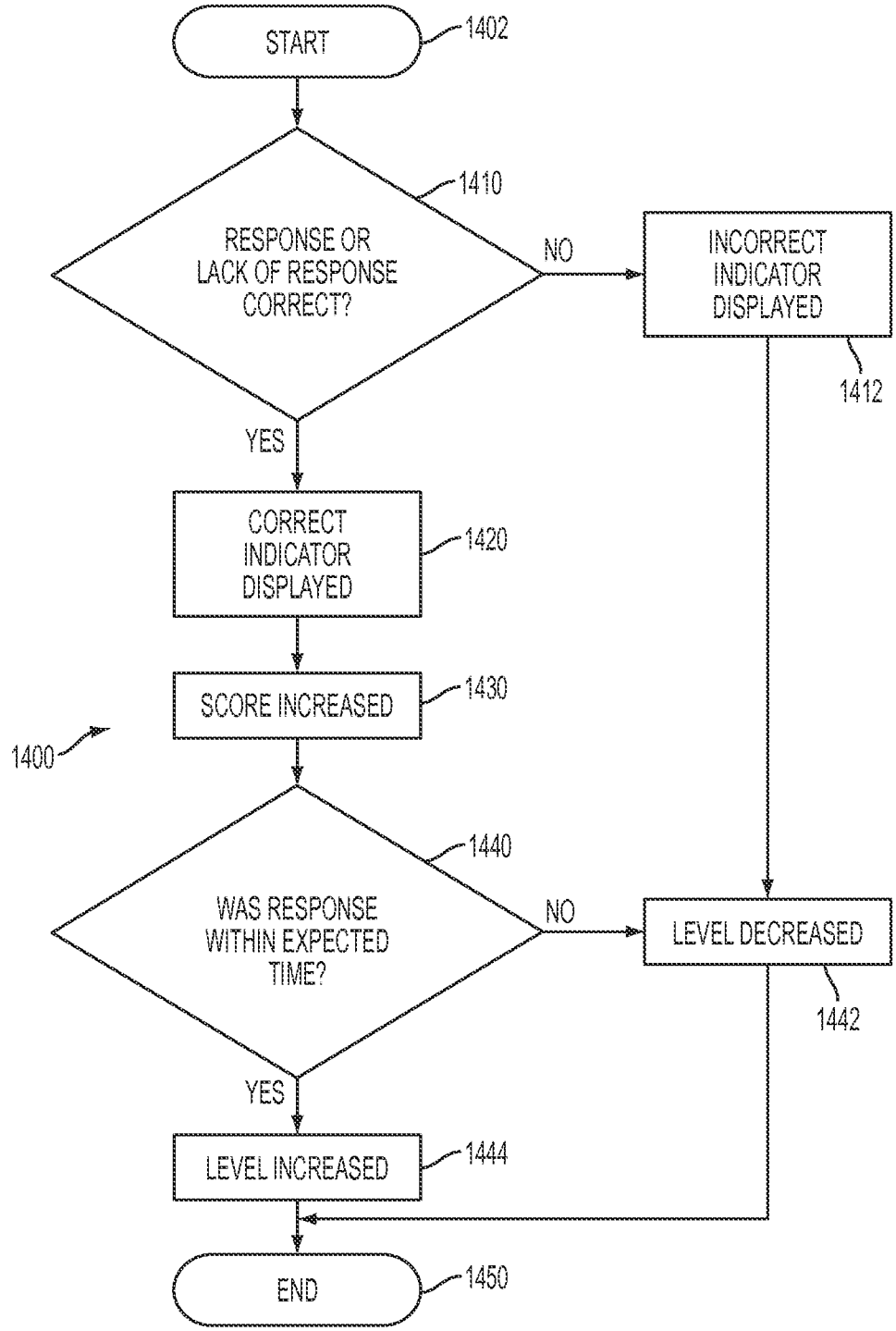
FIG. 14 is an illustration of a flow diagram showing a response to user interaction.

Turning to FIG. 14, there is shown a process flow diagram 1400 for responding to user interface responses. The process flow diagram 1400 can have a "start" button 1402. Thereafter, in a decision block 1410, the user computing device in a decision block 1410 can determine if the user "Response or lack of response correct?" If the response is not correct (NO) then in block 1412 the user computing device can display the incorrect signal (e.g., 1330 in FIG. 13). Thereafter, in "Level decreased" block 1442, the level of performance of the user can be decreased. If correct (YES), then the user computing device can, in block 1420 display the correct indicator, or, as noted simply leave the display screen unchanged, while perhaps giving another sensor signal such as a sound or vibration indicating the correct response. After the correct indicator is displayed pursuant to block 1420, the user score may be increased in block 1430. In a following decision block 1440 the user computing device may determine whether the response from the user was provided within an expected amount of time. If not (NO), then the level can be decreased in block 1442 and if the response was submitted within the expected time (YES), the level can be increased in block 1444. The process flow diagram can also have an end block 1450.

According to aspects of the disclosed subject matter, a user can be given a fixed amount of time to respond (e.g., 75 seconds) with a fixed number of trials, or the number of trials could be adjusted based on the response time registered for the user. The performance of the user can be determined by accuracy and/or speed, or other factors. A score, which may be determined as an example, as inversely proportional to the response time of the user with upper and lower bounds, can be increased after each occurrence of a "go-no go" trial. Other methods of scoring, including penalties for missed or incorrect responses may also be used. The current score, number of robots completed, and time remaining may be displayed to the user as a measure of progress, as shown in FIG. 1. Other measures such as average response time could also be shown to the user.

Figure 15:
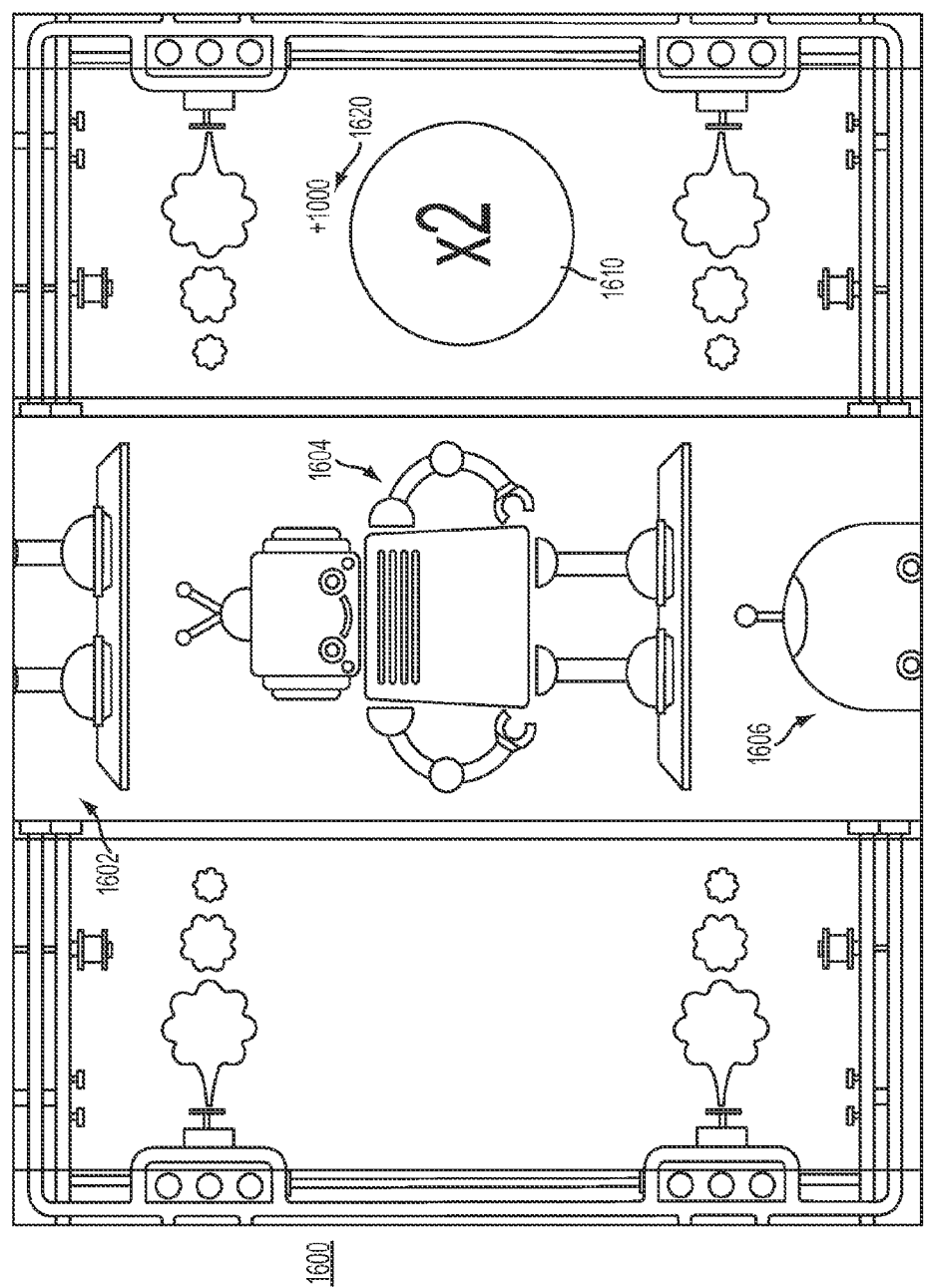
FIG. 15 is an illustration of a game screen showing an end of game which displays each completed robot and corresponding bonus points.
Figure 17:
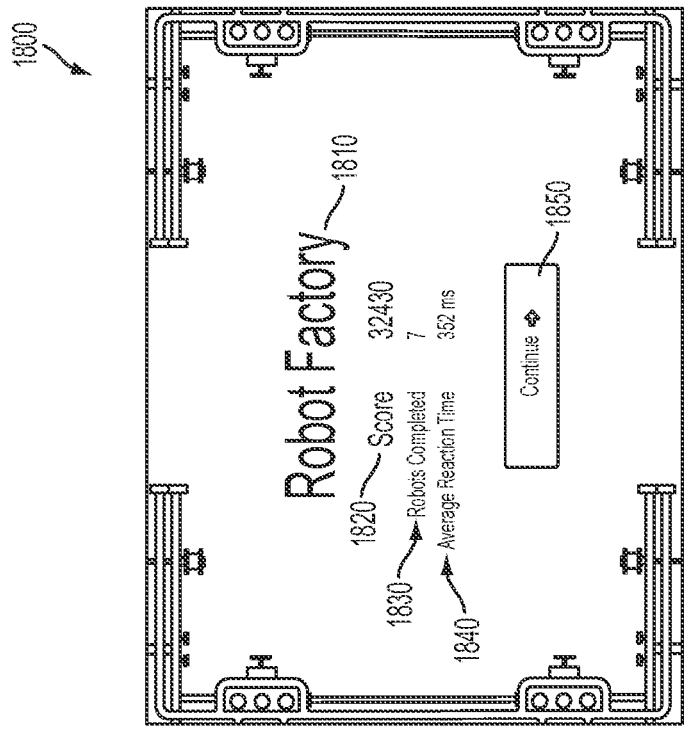
FIG. 17 is an illustration of a final screen displaying a score and user statistics.
Figure 16:
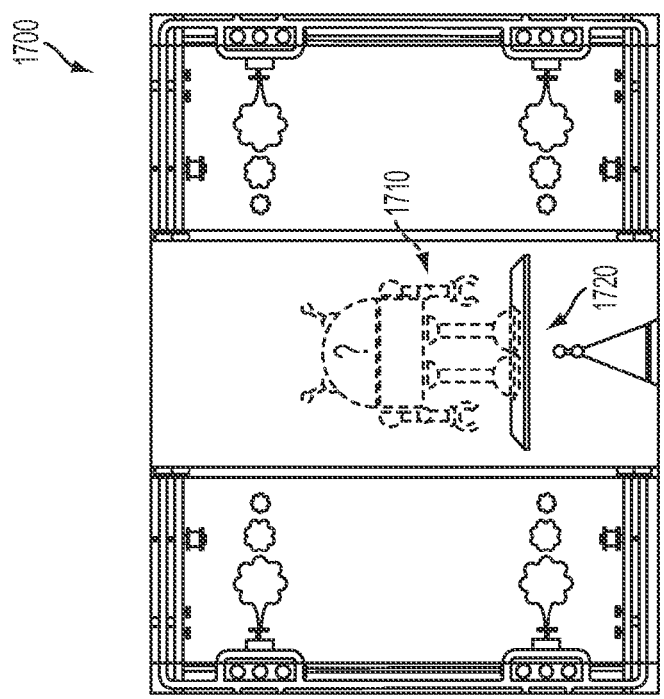
FIG. 16 is an illustration of an end of game screen wherein the user is encouraged to engage in future play by showing incomplete robots.

After the game is completed, such as, a fixed number of trials completed, or a robot structure and composition or a number of robot structures and compositions completed, the number of robots completed can be presented in a graphical fashion, as can be seen in FIG. 15 e.g., by scrolling up completed robot representations 1602, 1604 and 1608, etc. and bonus points 1620 can be awarded for example, for each completed robot, as can be seen in FIG. 15. A score multiplier 1610 may be displayed to indicate a level of performance reached by the user. Different robot designs (structures and configurations) may be used and uncompleted robots 1710, e.g., also along with a new type of component part 1720, may be signified with a question mark to encourage the user to improve in successive plays, as can be seen in (FIG. 16. The users may then be shown a results screen display 1800, on which the game title 1810 "Robot Factory", the user score 1820 for the completed trial(s) may be displayed along with an average response time 1840 and the number of robots completed by the user 1830 may be displayed as can be seen in FIG. 17. Other measures of performance, such as, number of successful stop trials could also be noted here. These values may be stored on the computing device or on a remote server and may be used to adjust the initial values of future gameplay cognitive skill training sessions.

It will be understood by those skilled in the art that a method and system for enhancing a cognitive ability of a user is disclosed, which may comprise: conducting, via a user interface display of a user computing device, a training session, e.g., including a number of trials of a user, which may comprise presenting, via the user interface display of the user computing device, a variable stimuli go/no-go behavior response exercise, which may comprise presenting a plurality of component delivery platforms; delivering a component corresponding to at least one of the plurality of components of the final assembled item to at least one of the component delivery platforms; allowing the user to select or not select the component on the at least one of the plurality of component delivery platforms according to at least one selection criteria; and scoring the correctness of the user selecting or not selecting the component according to the at least one selection criteria.

The method and system may further comprise presenting a representation of an outline/shadow of the assembled components of the final assembled item, such as a shadow of the final assembled item for example a robot complete with a head, torso, arms and legs, etc. The at least one selection criteria may include one of whether the component fits into the representation of the outline of the assembled components of the final assembled item, whether the component has been indicated to be ready for assembly to the final assembled item, whether the component has already been assembled onto the final assembled item and whether the component is a broken component. The method and system may further comprise presenting to the user, via the user interface display of the user computing device, an indication that a component is about to be delivered to the one of the plurality of component deliver platforms.

The method and system may further comprise presenting to the user, via the user interface display of the user computing device, at least one of a "go" and a "no-go" signal upon the delivery of the component to the component delivery platform. The method and system may further comprise determining, via the user computing device, a rate of delivery of components to the at least one of the component delivery platforms according to a determined level of performance of the user in correctly responding. The method and system may further comprise upon the user completing the assembly of a first assembled item, presenting the user, via the user display of the user computing device, with a second different final assembled item to be assembled. The method and system may further comprise signaling the user, via the user interface display of the user computing device, that the component delivered to the at least one of the component delivery platforms is ready for assembly onto the final assembled item.

A machine readable medium is also disclosed storing instructions that, when executed by a computing device, can cause the computing device to perform a method, which may comprise: conducting a training session which may comprise: presenting a variable stimuli go/no-go behavior response exercise, which may comprise: establishing an assembly platform containing an outline of component parts of a final assembled item; presenting a plurality of component delivery platforms; delivering a component corresponding to at least one of the plurality of components of the final assembled item to at least one of the component delivery platforms; allowing the user to select or not select the component on the at least one of the plurality of component delivery platforms according to at least one selection criteria; and scoring the correctness of the user selecting or not selecting the component according to the at least one selection criteria. The method may further comprise wherein the at least one selection criteria includes one of whether the component fits into the representation of the outline of the assembled components of the final assembled item, whether the component has been indicated to be ready for assembly to the final assembled item, whether the component has already been assembled onto the final assembled item and whether the component is a broken component.

The systems and methods according to aspects of the disclosed subject matter may utilize a variety of computer systems, communications devices, networks and/or digital/logic devices for operation. Each may in turn utilize a suitable computing device which can be manufactured with, loaded with and/or fetch from some storage device, and then execute, instructions that cause the computing device to perform a method according to aspects of the disclosed subject matter. A computing device can include without limitation a mobile user device such as a mobile phone, a smart phone and a cellular phone, a personal digital assistant ("PDA"), such as a BlackBerry, a tablet, a laptop and the like. In at least some configurations, a user can execute a browser application over a network, such as the Internet, to view and interact with digital content, such as screen displays. Access could be over or partially over other forms of computing and/or communications networks. A user may access a web-browser, e.g., to provide access to applications and data and other content located on a web-site or a web-page of a web-site.

A suitable computing device may include a processor to perform logic and other computing operations, such as a stand-alone computer processing unit ("CPU"), or hard wired logic as in a microcontroller, or a combination of both, and may execute instructions according to its operating system and the instructions to perform the steps of the method. The user's computing device may be part of a network of computing devices and the methods of the disclosed subject matter may be performed by different computing devices, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" shall include any and all of the above discussed logic circuitry, communications devices and digital processing capabilities or combinations of these. In at least some configurations, a user can execute a browser application over a network, such as the Internet, to view and interact with digital content, such as screen displays. Access could be over or partially over other forms of computing and/or communications networks.

Certain embodiments of the disclosed subject matter may be described for illustrative purposes as steps of a method which may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a RAM, a ROM, a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server accessed over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of enhancing a cognitive ability of a user by increasing inhibitory control of the user, comprising:
   conducting, via a user interface display of a user computing device, a training session comprising a game configured to drive neurological changes of the user to increase inhibitory control and enhance cognition of the user having a plurality of trials over a period of time comprising:
      compiling a plurality of components for delivery via the user interface display wherein a subset of the plurality of components for delivery form a final assembled item when assembled;
      presenting, via the user interface display of the user computing device, a plurality of component delivery locations wherein the plurality of component delivery locations combine to form an outline of an image of the final assembled item on the user interface display;
      delivering, via the user interface display of the user computing device, a component from the compiled plurality of components to the user interface display;
      receiving a selecting input or no input selection via a computing device input in response to the delivered component;
      determining an accuracy of an existence of an input during the receiving step wherein the selecting input selecting the delivered component is correct when a delivery location corresponding to the delivered component is available on the user interface display and no input in response to the delivered component is correct when the delivery location corresponding to the delivered component is not available on the user interface display;
      repeating the steps of delivering, receiving, and determining the accuracy of the existence of input until each of the plurality of component delivery locations on the user interface display has received a delivered component;
      calculating a user response score from a correctness of the input during the receiving steps wherein determining the accuracy of the receiving further includes one of determining whether the delivered component fits into a corresponding outline of a component delivery location in the outline of the final assembled item, whether the delivered component has been indicated to be ready for assembly to the final assembled item at the delivery location, whether the delivered component corresponds to a previously selected component that has already been assembled onto the final assembled item at the delivery location, and whether the delivered component is a broken component;
      determining whether a next trial is presented;
      if the next trial is presented, modifying a trial difficulty based on a prior calculated user response score.

2. The method of claim 1 further comprising:
   presenting, via the user interface display of the user computing device, an indication that the delivered component is about to be delivered to the one of the plurality of component delivery locations on the user interface display.

3. The method of claim 1 further comprising:
   presenting, via the user interface display of the user computing device, at least one of a "go" and a "no-go" signal upon the delivery of the component to a component delivery location on the user interface display.

4. The method of claim 1 further comprising:
   determining, via the user computing device, a rate of delivery of components to the at least one of the component delivery locations on the user interface display according to a level of performance of the user.

5. The method of claim 1 further comprising:
   upon completing an assembly of a first assembled item on the user interface display, presenting, via the user display of the user computing device, a second assembled item to be assembled.

6. The method of claim 1 further comprising:
   signaling, via the user interface display of the user computing device, that the component delivered to the at least one of the component delivery locations on the user interface display is ready for assembly onto the final assembled item.

7. The method of claim 1 wherein the final assembled item is a representation of a robot.

8. An apparatus for enhancing a cognitive ability of a user by increasing inhibitory control of the user comprising:
   a user computing device having a user interface display device and a user input device, the user computing device configured to:
      conduct, via a user interface display, a training session comprising a game configured to drive neurological changes of the user to increase inhibitory control and enhance cognition of the user having a plurality of trials delivered over a period of time comprising:
      compiling a plurality of components for delivery at a delivery location on the user interface display wherein a subset of the plurality of components for delivery form a final assembled item when assembled;
      presenting, via the user interface display, a plurality of component delivery locations wherein the plurality of component deliver locations combine to form an outline of an image of the final assembled item on the user interface display;
      delivering, via the user interface display, a component from the compiled plurality of components;
      receiving a selecting input or no input via the user input device in response to the delivered component;
      determining an accuracy of an existence of an input during the receiving step wherein the selecting input selecting the delivered component is correct when a delivery location corresponding to the delivered component is available on the user interface display and no input in response to the delivered component is correct when the delivery location corresponding to the delivered component is not available;

repeating the steps of delivering, receiving, and determining the accuracy of the existence of input until each of the plurality of component delivery locations on the user interface display has received a delivered component;

calculating a user response score from a correctness of the input received during the receiving steps;

determining whether a next trial is presented;

if the next trial is presented, modifying a trial difficulty based on a prior calculated user response score.

9. The apparatus of claim 8 further comprising:
presenting via the user interface display, an indication that the delivered component is about to be delivered to the one of the plurality of component delivery locations on the user interface display.

10. The apparatus of claim 8 further comprising:
presenting via the user interface display, at least one of a "go" and a "no-go" signal upon the delivery of the component to a component delivery location on the user interface display.

11. The apparatus of claim 8 further comprising:
determining a rate of delivery of components to the at least one of the component delivery location on the user interface display according to a determined level of performance of the user in correctly responding.

12. The apparatus of claim 8 further comprising:
upon completing an assembly of a first assembled item, presenting, via the user display of the user computing device, a second different final assembled item to be assembled.

13. The apparatus of claim 8 further comprising:
signaling via the user interface display, that the component delivered to the at least one of the component delivery location on the user interface display is ready for assembly onto the final assembled item.

14. The apparatus of claim 8 wherein the final assembled item is a representation of a robot.

15. A non-transitory machine readable medium storing instructions that, when executed by a computing device, cause the computing device to perform a method, the method comprising:

conducting a training session comprising a game configured to drive neurological changes of a user to increase inhibitory control and enhance cognition of the user having a plurality of trials delivered over a period of time comprising:

compiling a plurality of components for delivery via the user interface display wherein a subset of the plurality of components form a final assembled item when assembled on the user interface display;

presenting an assembly location on the user interface display;

presenting a plurality of component delivery locations which combine to form an outline of components for the final assembled item on the user interface display;

delivering a component from the compiled plurality of components on the user interface display;

receiving a selecting input or declining input via a user interface in response to the delivered component;

determining an accuracy of an existence of an input during the receiving step wherein the selecting input selecting the delivered component is correct when a delivery location corresponding to the delivered component is available and the declining input in response to the delivered component is correct when the delivery location corresponding to the delivered component is not available;

repeating the steps of delivering, receiving, and determining the accuracy of the selection until each of the plurality of component delivery locations has a delivered component;

calculating a user response score from a correctness of the input during the selecting step;

determining whether a next trial is presented;

if the next trial is presented, modifying a trial difficulty based on the calculated user response score.

16. The method of claim 1 further comprising:
storing a performance data for the user; and
adjusting a difficulty of a subsequent training session for the user based on an analysis of the prior stored performance data for the user.

* * * * *